May 24, 1927.

G. L. BULL 1,629,677

COMBUSTION ENGINE

Filed April 16, 1921

Inventor
George L. Bull.

By Harry C. Schroeder
Attorney

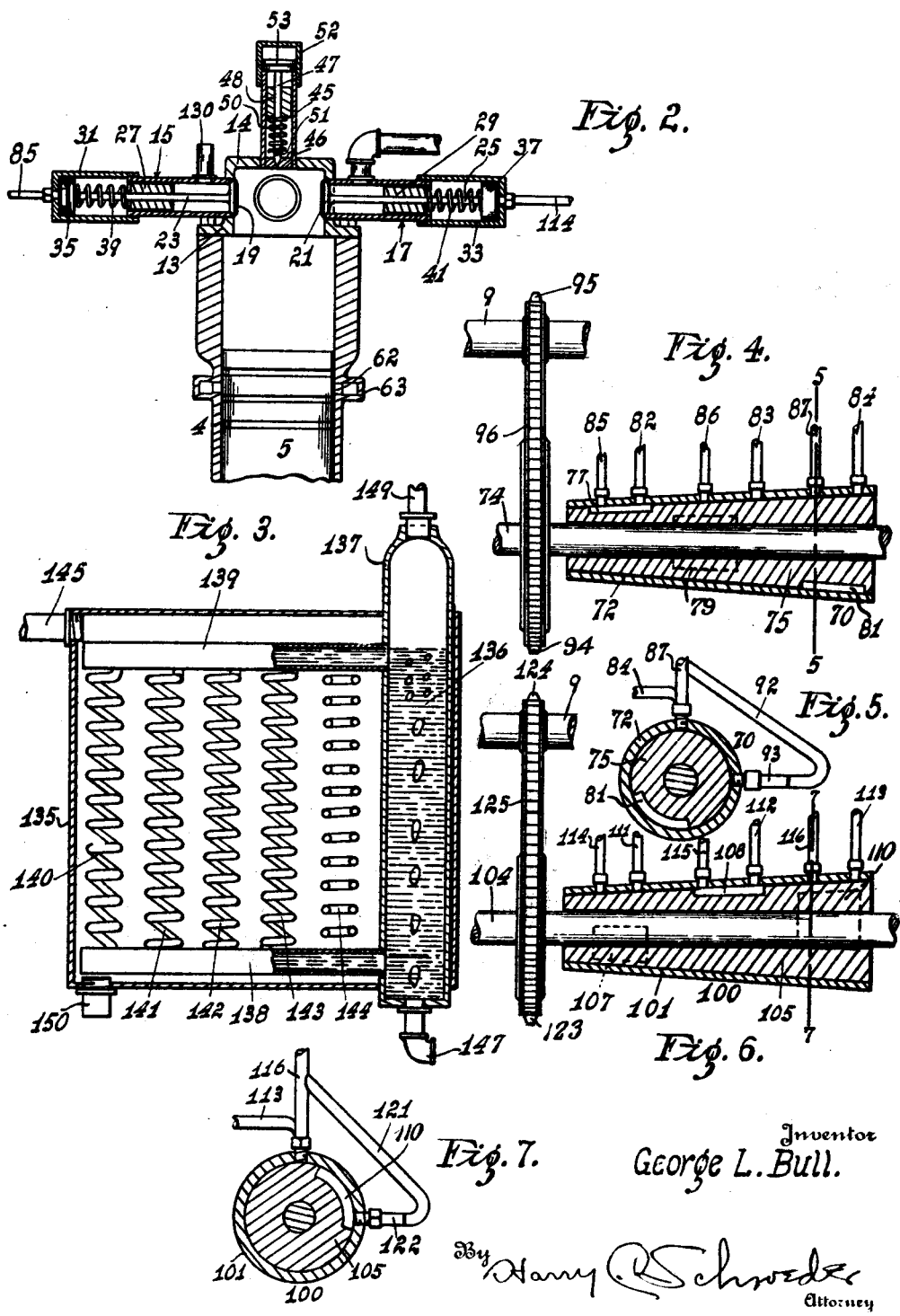

May 24, 1927.
G. L. BULL
1,629,677
COMBUSTION ENGINE
Filed April 16, 1921    3 Sheets-Sheet 3
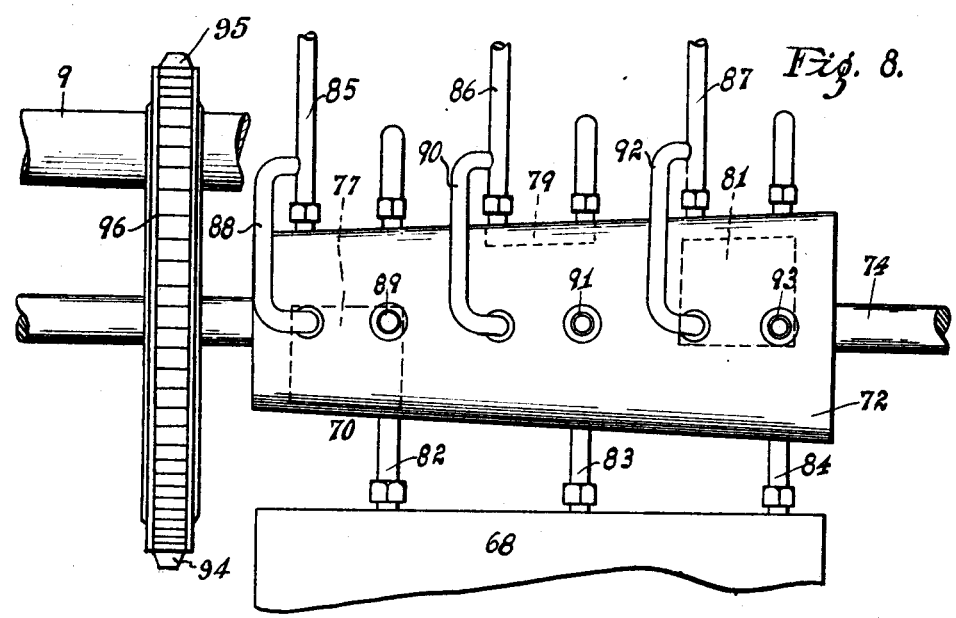
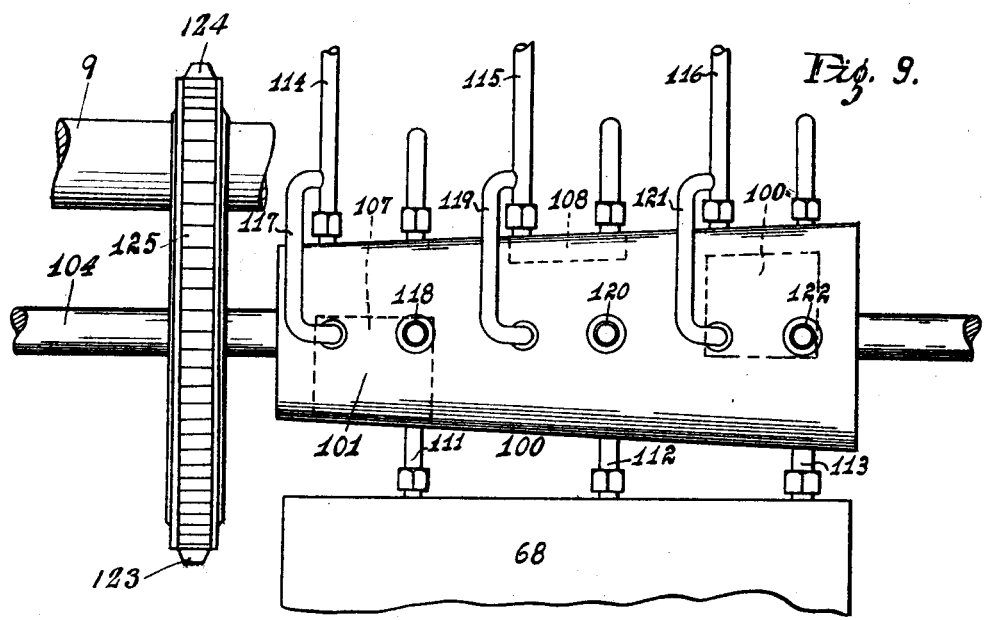
Inventor
George L. Bull.
By Harry C. Schroeder
Attorney Patented May 24, 1927.

1,629,677

UNITED STATES PATENT OFFICE.

GEORGE L. BULL, OF OAKLAND, CALIFORNIA.

COMBUSTION ENGINE.

Application filed April 16, 1921. Serial No. 461,797.

My invention is a compound internal combustion and steam engine and more particularly a compound compression, ignition and high and low pressure steam engine, in which the exhaust gas is utilized to generate the steam and the steam at high pressure is first utilized against one side of the piston and then at low pressure against the other side of the piston.

My invention is a coordinated internal combustion and steam engine and comprises a compression and fuel injection type of internal combustion engine with high and low pressure steam acting on the piston. The high pressure is used on the head of the piston and the combustion cylinder, and the low pressure on the crank end of the same piston. The steam is generated by utilizing the exhaust gas. The engine has a six stroke cycle.

A further object of the invention is to use the steam for cooling the engine and the piston and for this purpose it is particularly proposed to use a piston that is hollow at the crank case end and to cause the exhaust steam to be introduced below the piston on one or more return strokes, so as to be exhausted at the end of the return stroke after having absorbed heat units from the piston. This steam, if used on each return stroke, will aid in ejecting the products of combustion and a small residue remaining in the chamber below the piston serves as a cushion on the power strokes.

In this specification and the annexed drawings I disclose my invention in the form which I consider the best, but I do not limit my invention to such form, because it may be embodied in other forms, and it is to be understood that in and by the claims of this specification I intend to protect my invention in whatever form it may be embodied.

Referring to the drawings:

Figure 2 is a fragmentary vertical longitudinal section of the upper portion of my engine taken through the air intake and steam intake valves.

Figure 3 is a vertical section of the steam generator.

Figure 4 is a longitudinal section of the timing valve which controls the air intake valve, the oil intake valve and the gas exhaust valve.

Figure 5 is a cross section of the valve shown in Figure 4 taken on line 5—5 of said figure.

Figure 6 is a longitudinal section of the timing cylinder which controls the high pressure steam intake valve, the high pressure steam exhaust valve, and the low pressure steam intake valve.

Figure 7 is a cross section of the timing valve shown in Figure 6 taken on line 7—7.

Figure 8 is a diagrammatic side elevation of the timing valve which controls the air intake valve, oil intake valve and gas exhaust valve.

Figure 9 is a diagrammatic side elevation of the timing valve which controls the high pressure intake steam valve, the high pressure steam exhaust valve and the low pressure steam intake valve.

Figure 1:
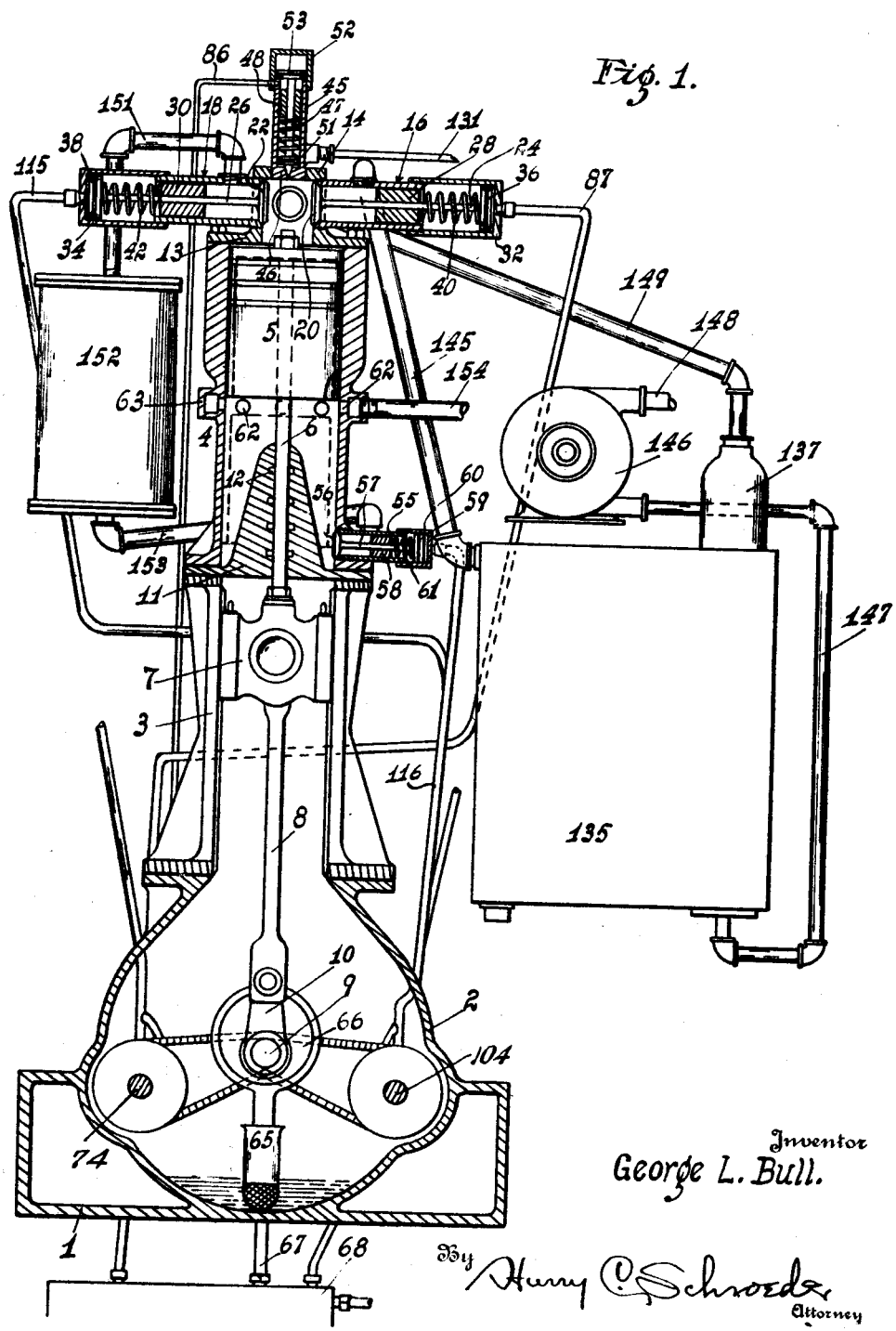
Figure 1 is a vertical longitudinal section of my engine taken through the gas exhaust and steam exhaust valves.

In the drawings 1 indicates the base of the engine; 2 the crank case formed integral with said base; 3 the cross-head guideway upstanding from the crank case; 4 the cylinder mounted on said guideway; 5 the piston in said cylinder; 6 the piston rod; 7 the cross head to which said piston rod is connected and which travels in said guideway; 8 the connecting rod connected at one end to said cross head; and 9 the crank shaft, to the crank 10 of which the other end of said connecting rod is connected. On the lower head 11 of the cylinder 4 is formed a bearing 12 through which the piston rod 6 reciprocates. The piston 5 is so formed as to receive the lower head 11 when the piston is at the lowermost point in its path of movement. The upper head 13 of the cylinder 4 is formed with a dome 14, in the side wall of which at 90° apart are screwed valve casings 15, 16, 17 and 18, the inner ends of which casings are controlled by air intake valve 19, gas exhaust valve 20, balanced steam intake valve 21, and steam exhaust valve 22 respectively. The stems 23, 24, 25 and 26 respectively of said valves are mounted to reciprocate in bearings 27, 28, 29 and 30 in the outer end of the valve casings 15, 16, 17 and 18 respectively. Cylinders 31, 32, 33 and 34 screw on the outer end of the valve casings 15, 16, 17 and 18 respectively, in which cylinders reciprocate pistons 35, 36, 37 and 38 respectively, which pistons are secured on the outer end of the valve stems 23, 24, 25 and 26 respectively. A spring 39 surrounds the valve stem 23 and bears at its ends against the bearing 27 and piston 35, said spring normally maintaining the air intake valve 19 closed. A spring 40 surrounds the valve stem 24 and bears at its ends against the bearing 28 and the piston 36 to normally hold the gas exhaust valve 20 closed. A spring 41 surrounds the valve stem 25 between the bearing 29 and piston 37 and normally holds the balanced steam intake valve 21 closed. A spring 42 surrounds the valve stem 26 between the bearing 30 and the piston 38 and normally holds the steam exhaust valve 22 closed. In the top of the dome 14 is screwed a valve casing 45 which has a valve seat 46 in its lower end in which seats a balanced needle oil valve 47, said valve being mounted to reciprocate in a bearing 48 in the upper end of said valve casing. A spring 50 surrounds the valve 47 between the bearing 48 and a pin 51 extending through the lower part of said valve, which spring normally holds said valve closed on its seat. A cylinder 52 screws on the upper end of the valve casing 48, in which cylinder reciprocates a piston 53 secured on the upper end of the valve 47. A valve casing 55 is screwed into the lower end of the cylinder 4, the inner end of which casing is controlled by a steam inlet valve 56, the stem 57 of which is mounted to reciprocate in a bearing 58 in the outer end of said casing. A cylinder 59 is screwed on the outer end of the casing 55, in which cylinder reciprocates a piston 60 secured on the outer end of the valve stem 57. A spring 61 surrounds the stem 57 between the bearing 58 and the piston 60 and normally holds the valve 56 closed. The cylinder 4 is provided with a plurality of exhaust ports 62 spaced circumferentially at a point just below the piston 5 when at the upper end of its stroke, which ports communicate with an annular external channel 63 on the cylinder.

In the lower part of the crank case 2 is mounted a pump 65 which is operated by an eccentric 66 on the crank shaft 9. A pipe 67 leads from the pump 65 to a pressure tank 68.

A valve 70 is mounted in the crank case 2, which valve comprises a casing 72 supported in the crank case by supports 73, a shaft 74 journaled in the crank case and a valve cone 75 secured on said shaft within said casing. The valve cone 75 has three ports 77, 79, and 81 in its periphery. Pipes 82, 83, and 84 lead from the tank 68 into the valve casing 72 in the path of rotation of ports 77, 79 and 81 respectively. A pipe 85 leads from the valve casing 72 at a point in the path of rotation of port 77 and connects with the air intake valve cylinder 31. A pipe 86 leads from the valve casing 72 at a point in the path of rotation of port 79 and communicates with the upper end of the oil intake valve casing 45. A pipe 87 leads from the valve casing 72 at a point in the path of rotation of port 81 and communicates with the outer end of the gas exhaust valve cylinder 32. An exhaust pipe 88 leads from the pipe 85 into the casing 72 at a point in the path of rotation of port 77. An outlet pipe 89 leads from the valve casing at a point in the path of rotation of the port 77. An exhaust pipe 90 leads from the pipe 86 into the valve casing 72 at a point in the path of rotation of port 79. An outlet 91 leads from the valve casing at a point in the path of rotation of port 79. An exhaust pipe 92 leads from the pipe 87 into the valve casing 72 at a point in the path of rotation of the port 81. An outlet pipe 93 leads from the valve casing at a point in the path of rotation of the port 80. A sprocket 94 is secured on the valve shaft 74 and a sprocket 95 is secured on the crank shaft 9, over which sprockets travels a chain 96 whereby the valve cone 75 is rotated. The pipes 88, 89, 90, 91, 92 and 93 communicate with the casing 72 at points 90° to the points of communication of the pipes 82, 83, 84, 85, 86 and 87 with said casing.

A valve 100 is mounted in the crank case 2, which valve comprises a valve casing 101 supported in the crank case by supports 103, a shaft 104 journaled in the crank case, and a valve cone 105 secured on said shaft within said casing. The valve cone 105 has three ports, 107, 108, and 110 in its periphery. Pipes 111, 112 and 113 lead from the tank 68 into the valve casing 101 in the path of rotation of the ports 107, 108 and 110 respectively. A pipe 114 leads from the valve casing 101 in the path of rotation of port 107 into the outer end of the high pressure steam intake valve cylinder 33. A pipe 115 leads from the valve casing 101 in the path of rotation of port 108 into the outer end of the high pressure steam exhaust valve cylinder 34. A pipe 116 leads from the valve casing 101 in the path of rotation of port 110 into the outer end of the low pressure steam intake valve cylinder 59. An exhaust pipe 117 extends from the pipe 114 into the casing 101 at a point 90° from the point from which the pipe 114 leaves the casing and in the path of travel of the port 107. An outlet pipe 118 leads from the valve casing at a point 90° from the point from which the pipe 114 leaves the casing and in the path of travel of the port 107. An exhaust pipe 119 leads from the pipe 115 into the valve casing 101 at a point 90° from the point of connection of pipe 114 with the casing and in the path of travel of the port 108. An outlet pipe 120 leads from the valve casing at a point 90° from the point of connection of pipe 115 with the casing and in the path of travel of port 108. An exhaust pipe 121 leads from the pipe 116 into the valve casing 101 at a point 90° from the point of connection of pipe 116 with said casing and in the path of travel of the port 110. An outlet pipe 122 leads from the valve casing at a point 90° from the point of connection of the pipe 116 with the casing and in the path of travel of the port 110. A sprocket 123 is secured on the valve shaft 104 and a sprocket 124 is secured on the crank shaft 9, over which sprockets travels a chain 125 whereby the valve cone 105 is rotated.

The air intake valve casing 15 has an air intake 130. A pipe 131 leads from an oil pressure tank (not shown) into the lower part of the oil intake valve casing 45. A mercury steam generator includes a gas chamber 135, a vertical steam generating chamber 136 which extends through the gas chamber at one side thereof, and is formed with a steam dome 137 at its upper end, lower and upper horizontal mercury tubes 138 and 139 extending from said steam generating chamber within the gas chamber, and a plurality of vertical spiral tubes 140, 141, 142, 143, and 144 which are connected at the lower ends to the tube 138 and at their upper ends to the tube 139. A gas exhaust pipe 145 leads from the gas exhaust valve casing 16 into the upper part of the gas chamber 135. From the outlet of a water pump 146 leads a pipe 147 which communicates with the lower end of the steam generating chamber 136. A pipe 148 leads from a source of water supply (not shown) and connects to the inlet of the pump 146. A steam pipe 149 leads from the steam dome 137 into the gas steam intake casing 17. The steam generating chamber 136, horizontal tubes 138 and 139, and spiral tubes 140 to 144 inclusive are filled with mercury up to a level corresponding to the position of the horizontal tube 139. The gas chamber 135 has an outlet 150 in its lower wall. A steam exhaust pipe 151 leads from the steam exhaust valve casing 18 into the upper end of an exhaust steam receiver 152. A pipe 153 leads from the lower end of the receiver 152 into the lower pressure intake valve casing 55. A steam exhaust pipe 154 leads from the steam exhaust channel 63.

The operation of my invention is as follows:

The pump 65 pumps oil from the crank case sump into the pressure tank 68. On the downward air intake stroke of the piston, oil is forced from the pressure tank 68 through pipe 82 into the valve casing 72, through port 77 and pipe 85 into cylinder 31 whereby the piston 35 is forced inwardly and the valve 19 opened and air is taken into the engine cylinder 4 through pipe 130 and valve casing 15. On the upward air compression stroke of the piston 5, the port 77 is turned out of registration with pipes 82 and 85 by the rotation of valve cone 75 from the crank shaft 9 through the medium of sprockets 95 and 94, chain 96 and valve shaft 74, shutting off the oil from the tank 68 through pipe 85, and the port 77 is brought into register with pipes 88 and 89, whereupon the oil is exhausted from cylinder 31 and pipe 85 through pipe 88, port 77, and pipe 89 back into the crank case sump and the air intake valve 19 is closed by its spring 39.

At the end of the upward air compression stroke of the piston, the port 79 registers with pipes 83 and 86 and oil is forced from the tank 68 through pipe 83, port 79, and pipe 86 into the upper end of valve casing 45, whereby the piston 53 is forced upwardly and the oil intake valve 47 opened, and fuel, consisting of oil vapor and super-heated steam is allowed to pass from said valve casing through port 46 into the cylinder dome 14 where it mixes with the hot compressed air, and the mixture is ignited and the piston 5 forced downwardly on its explosion stroke. The port 79 is then turned out of registration with pipes 83 and 86 and the port 79 brought into registration with pipes 90 and 91 whereupon the oil is exhausted from the cylinder 53 and the upper end of valve casing 45 and pipe 86, through pipe 90, port 79 and outlet pipe 91 back into the crank case sump, and the oil intake valve 47 is closed by spring 50.

On the upward exhaust stroke of the piston 5 the port 81 is turned into registration with the pipes 84 and 87 and oil is forced by the tank 68 through pipe 84, port 81 and pipe 87 into the gas exhaust valve cylinder 32, whereby the piston 36 is forced inwardly and the gas exhaust valve 20 opened, and the exhaust gas of the engine passes out through valve casing 16 and pipe 145 into the upper part of gas chamber 135 of the steam generator, where it circulates through said chamber and heats the mercury in the tubes 138 to 144 inclusive and the mercury and water in the steam generating chamber 136, converting the water into steam in dome 137, and then passes out of the gas chamber through outlet 150. The port 81 is then turned out of register with pipes 84 and 87 and the port 80 brought into register with pipes 92 and 93, whereupon oil from the tank 68 to gas exhaust cylinder 32 is shut off and the oil passes from said cylinder through pipes 87 and 92, port 80 and pipe 93 back into the crank case sump and the gas exhaust valve 20 is closed by spring 40.

On the next downward stroke of the engine piston 5 the port 107 is turned into registration with pipes 111 and 114 by the crank shaft 9 through the medium of sprockets 124 and 123, chain 125, shaft 104 and valve cone 102, and oil is forced from the pressure tank 68 through pipe 111, port 107 and pipe 114 into the steam intake valve cylinder 33, whereby the piston 37 is forced inwardly and the steam intake valve 21 opened, and steam is allowed to pass from dome 137, pipe 149 and valve casing 17 into the dome 14 and cylinder 4 where it expands against the piston under high pressure and forces the piston downwardly. The port 107 is then turned out of register with pipes 111 and 114 and the port 107 is turned into register with pipes 117 and 118, whereupon oil from the tank 68 to the cylinder 33 is shut off, and the oil in said cylinder passes out through pipe 114, pipe 117, port 107 and pipe 118 back into the crank case sump, while the steam intake valve 21 is closed by spring 41.

On the next upward or exhaust stroke of the piston 5 the port 108 is turned into register with pipes 112 and 115 and oil is forced from pressure tank 68 through pipe 112, port 108 and pipe 115, into high pressure steam exhaust valve cylinder 34 against piston 38, whereby the high pressure steam exhaust valve 22 is opened, and the steam is exhausted from the high pressure chamber of the cylinder 4 through valve casing 30, and pipe 151 into the receiver 152. The port 108 is then turned out of register with pipes 112 and 115 and the port 108 into register with pipes 119 and 120, whereupon the oil from the tank 68 to cylinder 34 is shut off and the oil passes out of said cylinder through pipes 115 and 119, port 108 and outlet pipe 120 back into the crank case sump, while the high pressure steam exhaust valve 22 is closed by its spring 42.

On the same upward stroke of the engine piston the port 110 is turned into registration with pipes 113 and 116 and oil is forced from the tank 68 through pipe 113, port 110 and pipe 116 into the low pressure intake valve cylinder 55 against the piston 59, whereby the low pressure steam intake valve 56 is opened and low pressure steam admitted from the receiver 152, through pipe 153 and the valve casing 55, into the lower end or low pressure steam chamber of the cylinder 4 which steam expands against the piston and forces it upwardly. The port 110 is then turned out of registration with pipes 113 and 116, and the port 110 is turned into registration with pipes 121 and 122, whereby oil is shut off from the cylinder 59, and the oil in the cylinder flows out through pipe 116, pipe 121, port 110 and pipe 122 back into the crank case sump, while the spring 61 closes the low pressure steam intake valve 56. The low pressure steam is exhausted at the upper end of the stroke of the piston 5 through exhaust ports 62, channel 63 and exhaust pipe 154.

This completes the cycle of operations of my engine.

A resumé of the operation of my engine is as follows:—The engine operates on the six stroke cycle in which on the first down stroke of the piston air is drawn into the cylinder through the air intake valve, the second or up stroke compresses the air to a pressure and temperature sufficient to ignite fuel, which is admitted through the first part of the third stroke at constant pressure. This is the second down stroke and is the internal combustion power stroke. On the fourth stroke, that is, the second upper movement of the piston, the gas is expelled through the gas exhaust valve to the steam generator, which generates high pressure steam. On the fifth stroke, which is the third down movement of the piston, the high pressure steam is introduced and expanded. On the sixth stroke, that is the third upward movement of the piston, the steam is discharged to a receiver.

The cycle therefore on the head end of the piston is a six stroke, and on the crank end is a two stroke. The flow of motive fluid is on the counterflow system in the head end and on the uniflow system on the crank end. The residual low pressure steam remaining in the cylinder after partial exhaustion through the uncovered port on the upstroke of the piston is compressed and is incorporated with the next intake from the receiver.

The use of high pressure steam in the combustion cylinder reduces the temperature, thereby lessening the metal stresses due to temperature and super-heats the steam. This steam is super-heated in passing into the receiver.

The terms "high" and "low" pressure of the steam are merely relative terms, and the initial steam pressure, the pressure in the receiver, and the pressure of the steam on admission to the low pressure cylinder, that is the crank end, may be regulated. The various valves may be constructed and operated in a manner somewhat similar to my U. S. Patent 1,473,077 for valve operating mechanism.

By these types of valves and the two rotors the cut-off fuel and its admission may be regulated to any point desired on the fuel stroke and maintain a constant pressure on the fuel: and the fuel can be made to penetrate the compressed air in the cylinder sufficiently to give complete combustion.

A resumé of the operation of the steam generator is as follows:

It will be noted that the generator is built somewhat the same as a steam generator with a series of coiled pipes and a stand pipe at one end. However, the generator is filled with mercury. The exhaust gases enter at the top of the generator and are exhausted at the bottom, thereby transferring the heat to the mercury. Water is forced into the bottom of the stand pipe and being lighter than mercury will pass upward being transformed into steam and the impurities in the water being lighter than mercury will float on the surface thereof.

I claim:—

1. In a compound engine of the character described, a cylinder, a hollow piston reciprocable therein, means for alternately driving the piston from one end thereof by a combustible charge and by steam, the latter serving to cool the cylinder walls, and means for exhausting the used steam into the opposite hollow end of the piston for cooling the wall of the latter.

2. A compound engine as defined in claim 1 in which control means are provided for timing the admission of exhaust steam into the piston.

3. A compound engine as defined in claim 1 in which a receiver and a periodically operated valve are interposed for controlling the admission of the exhaust steam into the opposite end of the piston.

4. In a compound engine of the character described, a cylinder, a hollow piston reciprocable therein, means for alternately driving the piston from one end thereof by a combustible charge and by steam, the latter serving to cool the cylinder walls, and being superheated thereby, heat exchange means using the exhausted products of combustion for generating the steam, and means for exhausting the used steam into the opposite hollow end of the piston for cooling the wall of the latter.

5. A compound engine as defined in claim 4, in which a receiver and a periodically operated valve are interposed for controlling the admission of steam into the opposite end of the piston.

In testimony whereof I affix my signature.

GEORGE L. BULL.